(12) United States Patent
Novellani et al.

(10) Patent No.: US 9,939,340 B2
(45) Date of Patent: Apr. 10, 2018

(54) PRESSURE AND TEMPERATURE DETERMINING DEVICE AND PRESSURE AND TEMPERATURE SENSOR COMPRISING SUCH A DEVICE

(71) Applicant: MGI COUTIER, Champfromier (FR)

(72) Inventors: Marc Novellani, Travaillan (FR); Chokri Ben Hammouda, Carpentras (FR)

(73) Assignee: MGI COUTIER, Champfromier (FR)

( * ) Notice: Subject to any disclaimer, the term of this patent is extended or adjusted under 35 U.S.C. 154(b) by 162 days.

(21) Appl. No.: 14/615,057

(22) Filed: Feb. 5, 2015

(65) Prior Publication Data

US 2015/0219514 A1 Aug. 6, 2015

(30) Foreign Application Priority Data

Feb. 5, 2014 (FR) ..................................... 14 50877

(51) Int. Cl.
| | | |
|---|---|---|
| *G01L 7/00* | (2006.01) | |
| *G01L 19/00* | (2006.01) | |
| *H01B 13/00* | (2006.01) | |
| *G01L 9/06* | (2006.01) | |

(52) U.S. Cl.
CPC .......... *G01L 19/0092* (2013.01); *G01L 9/065* (2013.01); *H01B 13/003* (2013.01); *H01B 13/0026* (2013.01)

(58) Field of Classification Search
CPC .................................................. G01L 19/0092
USPC ............................ 73/708, 714, 721; 427/100
See application file for complete search history.

(56) References Cited

U.S. PATENT DOCUMENTS

| | | | | |
|---|---|---|---|---|
| 5,088,329 A | * | 2/1992 | Sahagen ............... | G01L 9/0055 338/4 |
| 5,665,920 A | * | 9/1997 | Martin .................. | G01L 9/0075 73/715 |
| 7,152,478 B2 | * | 12/2006 | Peterson et al. ...... | G01L 9/0042 73/715 |
| 7,318,351 B2 | * | 1/2008 | Cobianu et al. ...... | G01L 9/0055 73/715 |
| 2002/0134513 A1 | * | 9/2002 | Palagashvili et al. .. | F28F 13/00 156/345.52 |
| 2005/0274191 A1 | * | 12/2005 | Hasegawa et al. ... | G01L 9/0055 73/721 |
| 2006/0000288 A1 | | 1/2006 | Pham et al. | |
| 2007/0113665 A1 | * | 5/2007 | Johnson ................ | G01L 9/0054 73/721 |

(Continued)

FOREIGN PATENT DOCUMENTS

EP 2182340 A1 5/2010

OTHER PUBLICATIONS

Preliminary Search Report issued in French Application No. 1450877, dated Oct. 3, 2014, pp. 1.*

*Primary Examiner* — Lisa Caputo
*Assistant Examiner* — Roger Hernandez-Prewitt
(74) *Attorney, Agent, or Firm* — Oliff PLC

(57) ABSTRACT

This pressure and temperature determining device includes a membrane, which has a face of contact with the fluid and a securing face opposite to the contact face, a pressure determining element secured to the membrane, and a temperature determining element secured to the membrane. The pressure determining element includes at least one piezoresistive track. The temperature determining element includes at least one thermoresistive track.

16 Claims, 4 Drawing Sheets

(56) References Cited

U.S. PATENT DOCUMENTS

2009/0314096 A1* 12/2009 Colombo ............ G01L 19/0084
73/754

* cited by examiner

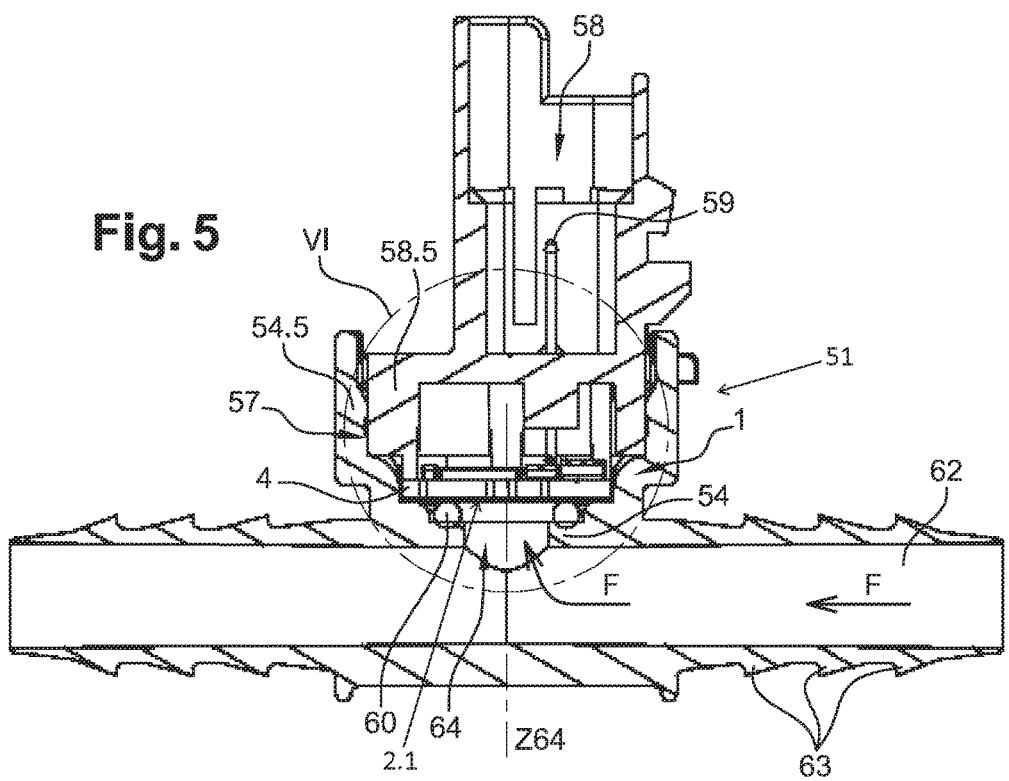
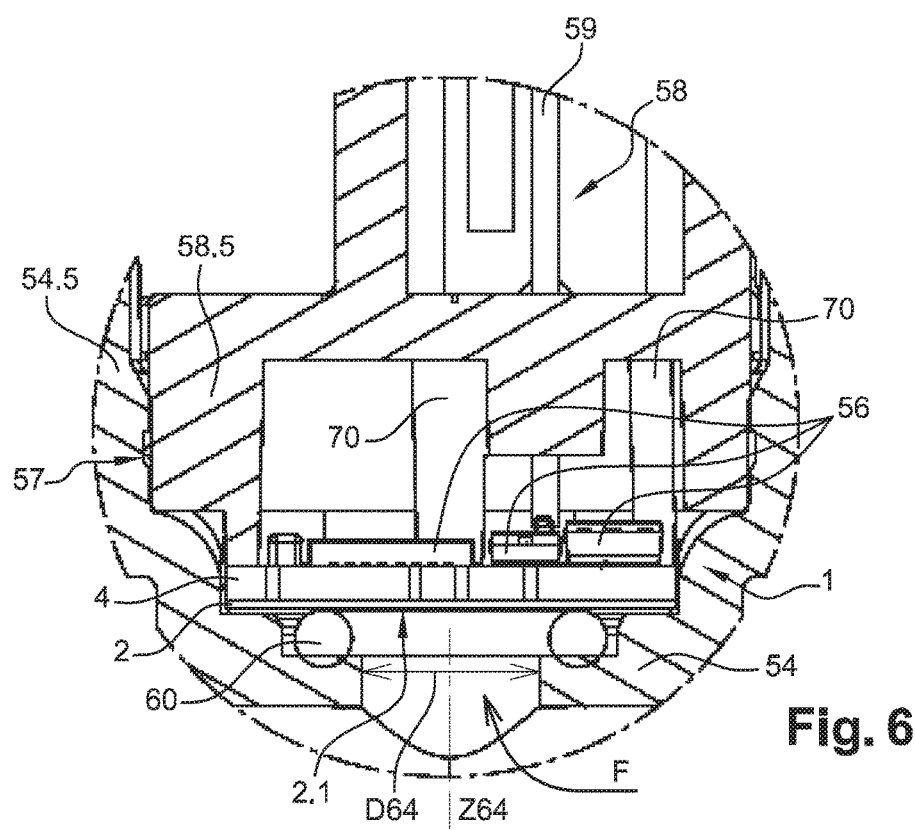

PRESSURE AND TEMPERATURE DETERMINING DEVICE AND PRESSURE AND TEMPERATURE SENSOR COMPRISING SUCH A DEVICE

The present invention concerns a pressure and temperature determining device intended to determine pressures and temperatures of a fluid, flowing for example in an automotive vehicle. In addition, the present invention relates to a pressure and temperature sensor comprising such a pressure and temperature determining device. Moreover, the present invention relates to a method for manufacturing such a pressure and temperature determining device.

The present invention applies particularly to the field of automotive vehicles, in particular to utility vehicles, passenger vehicles and heavy goods vehicles, in order to determine and measure pressures and temperatures of the different fluids flowing in such a vehicle, such as fuel, oil, urea (SCR) or air flowing in the air intake circuit.

EP0893676A2 illustrates a pressure and temperature sensor which comprises a pressure and temperature determining device comprising a membrane in contact with the fluid, a pressure determining element and a temperature determining element. The pressure determining element is composed of a capacitive element.

However, such a capacitive element that is sufficiently accurate and reliable must be voluminous, thereby inducing a significant bulk for the pressure and temperature determining device. Furthermore, due to this bulk, the temperature determining element must be installed on the face of the membrane which is in contact with the fluid. On the one hand, such an installed mounting requires welds and holes through the membrane, which may cause sealing and pollution problems for the pressure and temperature sensor. On the other hand, such a mounting reduces the service life of the pressure and temperature determining device, because the temperature determining element is exposed to corrosive fluids, such as fuel. Otherwise, such a mounting of the temperature determining element considerably increases the manufacturing cost, because the temperature determining element must be protected.

The present invention aims in particular to solve all or part of the problems mentioned hereinbefore.

To this aim, the invention relates to a pressure and temperature determining device, intended to determine pressures and temperatures of a fluid, flowing for example in an automotive vehicle, the pressure and temperature determining device comprising:
- a membrane having a contact face intended to be in contact with the fluid,
- at least one pressure determining element which is sensitive to pressure and which is secured to the membrane, and
- at least one temperature determining element which is sensitive to temperature and which is secured to the membrane;

the pressure and temperature determining device being characterized:
- in that said at least one pressure determining element comprises at least one piezoresistive track, and
- in that said at least one temperature determining element comprises at least one thermoresistive track.

In other words, the pressure and temperature determining device forms a combined device for determining pressures and temperatures. Thus, such a pressure and temperature determining device is particularly compact. In fact, the piezoresistive track(s) and the thermoresistive track(s) respectively form pressure determining elements and temperature determining elements which are compact and integrated onto the membrane. The bulk is thus reduced, because the presence of piezoresistive tracks and thermoresistive tracks reduces the required number of components, for example to 8, instead of 18 with a pressure and temperature determining device of the prior art. Furthermore, by comparing the capacitive elements being used by the pressure and temperature determining devices of the prior art, a piezoresistive track is more robust, simpler to implement. Thus, the pressure and temperature determining device has a relatively low cost. Moreover, a thermoresistive track is effective in terms of temperature response time.

In the present invention, the term "determine" and its derivatives mean emitting a signal representative of a physical quantity. Thus, a pressure determining element emits signals representative of the pressure, and a temperature determining element emits signals representative of the temperature.

A piezoresistive track may form a pressure determining element, because, under the effect of pressure exerted by the fluid on the contact face, the piezoresistive track is subjected to an imbalance proportional to this pressure, and therefore generates a voltage representative of this pressure. In fact, a piezoresistive component has an electrical resistance which changes depending on the mechanical load (pressure) subjected by this component.

A thermoresistive track may form a temperature determining element, because its electrical resistance is representative of the temperature of the membrane, which is subjected to temperature variations imposed by the fluid. In fact, a thermoresistive component has an electrical resistance which varies depending on the temperature to which this component is exposed.

A signal conditioning electronic unit may, thereafter, condition the signals of the piezoresistive track(s) and thermoresistive track(s), for example amplify and/or linearize them.

According to an embodiment of the invention, the membrane further has a securing face opposite to the contact face, and said at least one pressure determining element and said at least one temperature determining element are secured directly to the securing face.

Thus, as the pressure and temperature determining elements are not exposed to the fluid, the pressure and temperature determining device has a very high resistance to corrosive fluids such as fuel. In addition, as the pressure and temperature determining elements are integrated onto the membrane without a layer or an intermediate film, the pressure and temperature determining device allows optimizing the measurements, in particular because that reduces thermal inertia, thereby allowing rapidly heating up the thermistor.

Alternatively, said at least one pressure determining element and said at least one temperature determining element may be secured indirectly to the securing face. For example, a layer may be interposed between the securing face and said at least one piezoresistive track or said at least one thermoresistive track.

According to an embodiment of the invention, said at least one piezoresistive track is printed on the membrane, preferably by screen-printing, and said at least one thermoresistive track is printed on the membrane, preferably by screen-printing.

Thus, the pressure and temperature determining device has a relatively low cost, because the piezoresistive track(s)

and the thermoresistive track(s) are obtained by printing, thereby allowing realizing very accurate printed tracks, in a simple manner.

According to variant of the invention, said at least one piezoresistive track is composed of at least one material selected from the group constituted of mineral matrices or organic polymeric matrices.

Thus, such a material allows conferring to the piezoresistive track good pressure determining properties, particularly in terms of gauge factor, linearity and hysteresis of the response curve, resolution, accuracy, response time. For example, the or each piezoresistive track may be composed of ruthenate (ruthenium oxide).

According to variant of the invention, said at least one piezoresistive track has a thickness comprised between 0.2 mm and 1.0 mm.

According to an embodiment of the invention, said at least one piezoresistive track forms several pressure gauges distant from one another, the pressure and temperature determining device further comprising conductive tracks linking the pressure gauges so as to form a pressure measuring electrical circuit, for example a Wheatstone bridge.

Thus, such pressure gauges, coupled to such a pressure measuring electrical circuit allow determining pressure with high accuracy and short response time. These conductive tracks may be composed of a silver-palladium (Pd—Ag) alloy.

In the present application, the terms "conduct", "link", "connect" and their derivatives refer to electrical conduction.

According to a variant, said at least one thermoresistive track may be composed of metal oxides.

Thus, such a material allows conferring to the thermoresistive track good temperature determining properties, particularly in terms of resolution, linearity, accuracy and response time.

According to a variant of the invention, said at least one thermoresistive track has a thickness comprised between 0.2 mm and 1.0 mm.

According to a variant of the invention, said at least one thermoresistive track has a Negative Temperature Coefficient (NTC). Alternatively, said at least one thermoresistive track has a Positive Temperature Coefficient (PTC).

According to a variant of the invention, said at least one thermoresistive track forms several temperature gauges distant from one another, the pressure and temperature determining device further comprising conductive tracks linking the temperature gauges so as to form a temperature measuring electrical circuit, for example a Wheatstone bridge. Thus, such distant temperature gauges allow determining temperatures at several points, and therefore obtaining a highly accurate average temperature. The temperature measuring electrical circuit can be independent or not of the pressure measuring electrical circuit.

According to an embodiment of the invention, the membrane is composed of a ceramic, preferably comprising at least 95% alumina, the membrane preferably having a thickness comprised between 0.2 mm and 2.0 mm.

Thus, such a ceramic allows the membrane to be deformed rapidly under the effect of the pressure exerted by the fluid, so that the or each piezoresistive track can determine the pressure of the fluid. In addition, such a ceramic allows a rapid and accurate deposit of the piezoresistive track(s) and the thermoresistive track(s).

According to an embodiment of the invention, the membrane is substantially flat.

Thus, such a membrane has a planar securing face, thereby simplifying the deposit of the or each piezoresistive track.

Alternatively, the membrane may have a three-dimensional shape, that is to say a non-flat shape. In particular, the membrane may define a glove-finger-like volume projecting inside a fluid pipe, in order to accurately determine the temperature by positioning this glove finger directly in the fluid stream.

According to a variant of the invention, the membrane may have a substantially elliptical shape, for example a circular shape, or a substantially rectangular shape, for example a square shape.

According to a variant of the invention, the pressure and temperature determining device further comprises a base, preferably comprising at least 95% alumina, said base being configured to define a chamber around said at least one piezoresistive track and said at least one thermoresistive track.

Thus, such a base defining the chamber allows carrying out measurements of relative or absolute pressure. In addition, such a base may support on the one hand the membrane and on the other hand a signal conditioning electronic unit.

According to a variant of the invention, the membrane is installed on the base (a technology called "flush-membrane"). For example, the pressure and temperature determining device can, furthermore, comprise a glass seal secured to the base and to the membrane on the periphery of the securing face.

Thus, such a glass seal allows sealing a chamber surrounding said at least one piezoresistive track and said at least one thermoresistive track. To manufacture this glass seal, a glass paste (silica) must be disposed on the periphery of the securing face between the membrane and the base, then heated up to the melting temperature of the glass.

Alternatively, the membrane is integral with the base. In other words, the membrane and the base form a monolithic assembly for example devoid of any glass seals.

According to an embodiment of the invention, the base has at least one venting hole opening on the one hand onto the membrane and on the other hand onto the outer face of the base.

Thus, such a venting hole allows measuring relative pressures.

Alternatively, the base is configured so that the chamber is hermetically sealed. In other words, the base is devoid of any venting holes. Thus, such a base allows measuring absolute pressures.

In addition, the present invention relates to a pressure and temperature sensor, intended to measure pressures and temperatures of a fluid, flowing for example in an automotive vehicle, the pressure and temperature sensor comprising at least:
- a pressure and temperature determining device according to the invention,
- a coupling member configured to fluidly couple the contact face with a pipe of the fluid,
- a signal conditioning electronic unit connected on the one hand to said at least one piezoresistive track and on the other hand to said at least one thermoresistive track, and
- a connector linked to the signal conditioning electronic unit and having output terminals.

Thus, such a combined pressure and temperature sensor is particularly reliable, accurate, compact, lightweight with respect to a combined pressure and temperature sensor of the prior art. In addition, because of the simplicity of the structure of the pressure and temperature determining device, the electronic circuit for connecting the pressure and temperature determining elements is simpler than a combined pressure and temperature sensor of the prior art.

In the present application, the term "sensor" designates an assembly, the response of which, whether digital or analog, is representative of the physical quantities measurement, in this case, pressure and temperature.

According to a variant of the invention, the signal conditioning electronic unit comprises a signal amplifier and/or a signal linearizing component. The amplifier and/or the linearizing component may be for example integrated in the Application-Specific Integrated Circuit (ASIC).

Depending on the application intended for the pressure and temperature determining device, the signal conditioning electronic unit can deliver an analog response or a digital response.

According to a variant of the invention, the components of the signal conditioning electronic unit are secured to the base in a hybrid manner. Alternatively, the signal conditioning electronic unit is formed on a printed circuit which is installed on the base for example by welding.

According to a variant of the invention, the coupling member has a passageway for the fluid having dimensions comprised between 2 mm and 6 mm.

Thus, such a diameter allows minimizing the temperature response time while ensuring measurement of static pressure. A static pressure can be measured, because the passageway for the fluid can be arranged perpendicular to the flow direction of the fluid in the conduit on which the sensor is mounted.

Alternatively, the passageway for the fluid can be arranged obliquely, for example at 45 degrees, to the flow direction of the fluid in the conduit on which the sensor is mounted.

According to an embodiment of the invention, the pressure and temperature sensor according to the invention further comprises an O-ring joint which is compressed between the contact face and the periphery of the coupling member, the coupling member having a passageway for the fluid with a substantially circular section, the diameter of which is substantially equal to the internal diameter of the O-ring joint after compression of the O-ring joint.

Thus, such a concurrent arrangement of the internal perimeter of the O-ring joint and the perimeter of the fluid passageway of the coupling member limits, or even, prevents stagnation of the fluid. This allows for a rapid heat transfer, by forced convection, from the fluid to the membrane. In fact, in the areas of stagnation of the fluid, the heat transfer is slow, because it is taking place by natural conduction and convection.

According to an embodiment of the invention, the pressure and temperature sensor further comprises at least two bearing pads arranged in a bearing plane on the one hand against the base and on the other hand against the connector.

Thus, the planarity of the bearing pads guarantees the homogeneity of the load exerted on the membrane, this homogeneous load allowing making the compression of the O-ring joint uniform, and therefore achieving an optimal hermetic sealing. The homogeneity of the load also contributes to the accuracy of the pressure measurement.

According to an embodiment of the invention, the pressure and temperature sensor further comprises elastic and conductive strips arranged respectively between said output terminals and the base or said signal conditioning electronic unit.

Thus, such elastic and conductive strips (also known as "contact spring") allow an easy assembly of the pressure and temperature sensor, because these strips may be compressed during assembly of the connector with the coupling member so as to establish the electrical contacts. For example, these elastic and conductive strips can be welded or brazed onto the base and/or said signal conditioning electronic unit.

According to a variant of the invention, the base has connection ports having a conductive coating, and the pressure and temperature sensor further comprises conductive blades with direct plug-in (also known as "press-fit") which are inserted or overmolded respectively in the connection ports. Thus, such elastic and conductive terminals allow an easy assembly of the pressure and temperature sensor, because these terminals can be inserted or overmolded during the assembly of the connector with the coupling member so as to establish the electrical contacts.

According to an embodiment of the invention, the coupling member includes a fastening portion and the connector includes a fastening part, the fastening portion being secured to the fastening part by welds.

According to a variant of the invention, the fastening portion entirely or partially covers the fastening part.

Alternatively, the fastening portion entirely or partially covers the fastening part.

According to a variant of the invention, the dimensions of the fastening portion and the fastening part are determined in such a way that the assembly of the fastening portion and the fastening part is aligned or tight. Thus, the small clearance between the fastening portion and the fastening part allows obtaining an optimal and mechanically resistant weld.

According to a variant of the invention, all or some of the welds are located on at least one welding surface which is transverse, preferably perpendicular, to the contact face.

For example, the welds may be located on a welding surface which is cylindrical and which extends around the or a fluid passageway of the coupling member. Thus, since the welds are transverse to the contact face, the coupling member is mounted axially abutting against the connector, thereby allowing holding the components of the pressure and temperature sensor in place and achieving a constant load exerted on the membrane. The chain of dimensions between the different components is guaranteed by this axial abutment.

According to a variant of the invention, all or some of the welds are located on at least one welding surface which is parallel to the contact face. For example, the welds may be located on a welding surface which is annular and which extends around the or a fluid passageway of the coupling member.

To weld the coupling member and the connector, an entity among the coupling member and the connector is composed of a laser-transparent plastic material, the other entity among the connector and the coupling member being composed of a laser-opaque plastic material.

Thus, that allows welding the connector on the coupling member by heating up an outer region of the laser-opaque plastic material by means of a laser passing through the laser-transparent plastic material. It is possible to make a plastic material laser-transparent or laser-opaque by incorporating specific colorants thereto.

Alternatively, the coupling member may be metallic.

According to a variant of the invention, the coupling member and the connector are composed of polymer material selected from the group constituted of polyamide (PA), polyphthalamide (PPA), polyphenylsulfone (PPS), polyetherimide (PEI) and polyetheretherketone (PEEK).

According to a variant of the invention, the coupling member may be composed of a polymer filled with a conductive material such as carbon black, carbon nanotubes or carbon fibers. Thus, such a coupling member prevents the accumulation of electrostatic charges which are for example generated by the fluid passage.

According to a variant of the invention, the external surface of the pressure and temperature sensor includes a coating with an electrically conductive material. Thus, such a conductive coating may form an electromagnetic shielding, for the purpose of compliance with the requirements of electromagnetic compatibility (EMC).

According to a variant of the invention, the coupling member is configured so as to be coupled transversely, preferably perpendicularly, to the flow direction of the fluid in a pipe belonging to the automotive vehicle. Thus, the pressure and temperature sensor disturbs the fluid flow to the least possible extent.

According to a variant of the invention, the pressure and temperature sensor further comprises at least one sealing joint adapted to provide hermetical sealing between the pressure and temperature sensor and a complementary housing of the automotive vehicle, the connector or the coupling member having a groove configured to partially receive the sealing joint.

Thus, such a sealing joint allows a fastening of the pressure and temperature sensor on the automotive vehicle in a removable manner, for example by means of a staple, thereby allowing dismounting and replacing the pressure and temperature sensor where appropriate.

Moreover, the present invention relates to a manufacturing method, for manufacturing a pressure and temperature determining device according to the invention, the manufacturing method comprising the steps of:
- depositing conductive tracks on the membrane, preferably through a first printing screen and in thick layer,
- depositing said at least one piezoresistive track, preferably through a second printing screen, so as to secure said at least one piezoresistive track to with the membrane, and
- depositing said at least one thermoresistive track, preferably through a third printing screen, so as to secure said at least one thermoresistive track to the membrane.

Thus, such a manufacturing method is simpler and more rapid than a manufacturing method of the prior art. In fact, the presence of piezoresistive and thermoresistive tracks reduces the number of required components to be assembled, for example to 8, instead of 18 with a pressure and temperature determining device of the prior art. The order of the steps of this manufacturing method can be modified without departing from the scope of the present invention.

According to a variant of the invention, after at least one of said depositing steps, the manufacturing method further comprises a step consisting in carrying out a steaming and a suitable heat treatment in order to evaporate the solvents.

According to a variant the invention, the manufacturing method further comprises a step consisting in setting, by laser adjustment (a technique known as "laser trimming"), said at least one piezoresistive track and said at least one thermoresistive track.

Thus, such a laser adjustment allows defining pressure and temperature determining elements with high accuracy, thereby increasing the performances of the pressure and temperature determining device.

Moreover, the present invention relates to an automotive vehicle comprising at least one such pressure and temperature sensor.

The embodiments and alternative embodiments mentioned hereinbefore may be considered separately or according to any technically feasible combination.

The present invention will be better understood and its advantages will be also highlighted in the light of the description which follows, given solely by way of non-limiting example and with reference to the appended drawings, in which:

FIG. 5 is a section of a pressure and temperature sensor comprising the pressure and temperature determining device of FIG. 2;

FIG. 6 is a view of detail VI of FIG. 5;

FIGS. 1, 2, 3, 4, 5 and 6 illustrate a pressure and temperature determining device 1 belonging to a pressure and temperature sensor, which is illustrated in FIGS. 5 and 6 and which equips an automotive vehicle not represented here. The pressure and temperature determining device 1 is intended to determine pressures, symbolized by the arrows P in FIG. 1, and temperatures of a fluid, the flow of which is symbolized by the arrows F in FIGS. 5 and 6 and which flows in an automotive vehicle.

The pressure and temperature determining device 1 comprises a membrane 2 which has a contact face 2.1 intended to be in contact with the fluid F. In the example of FIGS. 1 to 6, the membrane 2 is composed of a ceramic comprising 96% alumina. The membrane 2 here has a thickness of about 1.0 mm. The membrane 2 is flat and circular-shaped.

Figure 2:
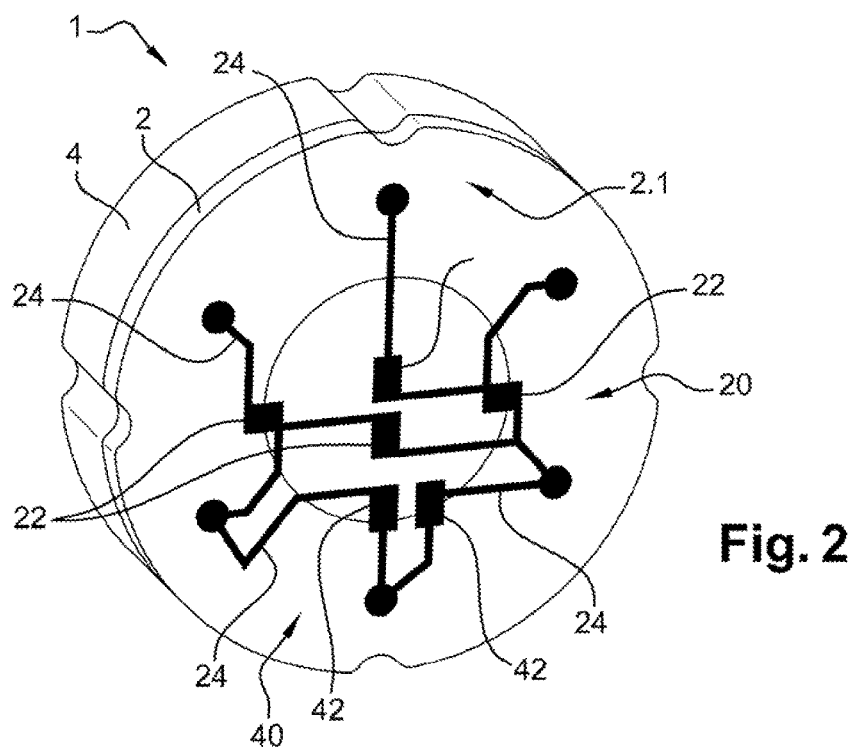
FIG. 2 is a perspective view of the pressure and temperature determining device of FIG. 1.

The pressure and temperature determining device 1 further comprises a pressure determining element 20 which is sensitive to pressure P and which is secured to the membrane 2. As shown in FIG. 2, the pressure determining element 20 comprises piezoresistive tracks 22, visible in FIG. 2.

The piezoresistive tracks 22 have each a thickness of about 0.5 mm. The membrane 2 has a certain flexibility, so as to transmit the pressure P to the piezoresistive tracks 22.

The pressure and temperature determining device 1 further comprises a temperature determining element 40 which is sensitive to temperature and which is secured to the membrane 2. As shown in FIG. 2, the temperature determining element 40 comprises thermoresistive tracks 42.

Each thermoresistive track here has a Negative Temperature Coefficient (NTC). The thermoresistive tracks 42 have each a thickness of about 0.4 mm. When the fluid F is in contact with the contact face 2.1, the membrane 2 is brought to the temperature of the fluid, so that the membrane 2 brings the thermoresistive tracks 42 to a temperature representative of the fluid F.

The membrane 2 further has a securing face 2.2 which is opposite to the contact face 2.1. The pressure determining element 20 and the temperature determining element 40 are here secured to the securing face 2.2. In this case, the piezoresistive tracks 22 are screen-printed on the securing face 2.2. Similarly, the thermoresistive tracks 42 are screen-printed on the securing face 2.2.

Figure 3:
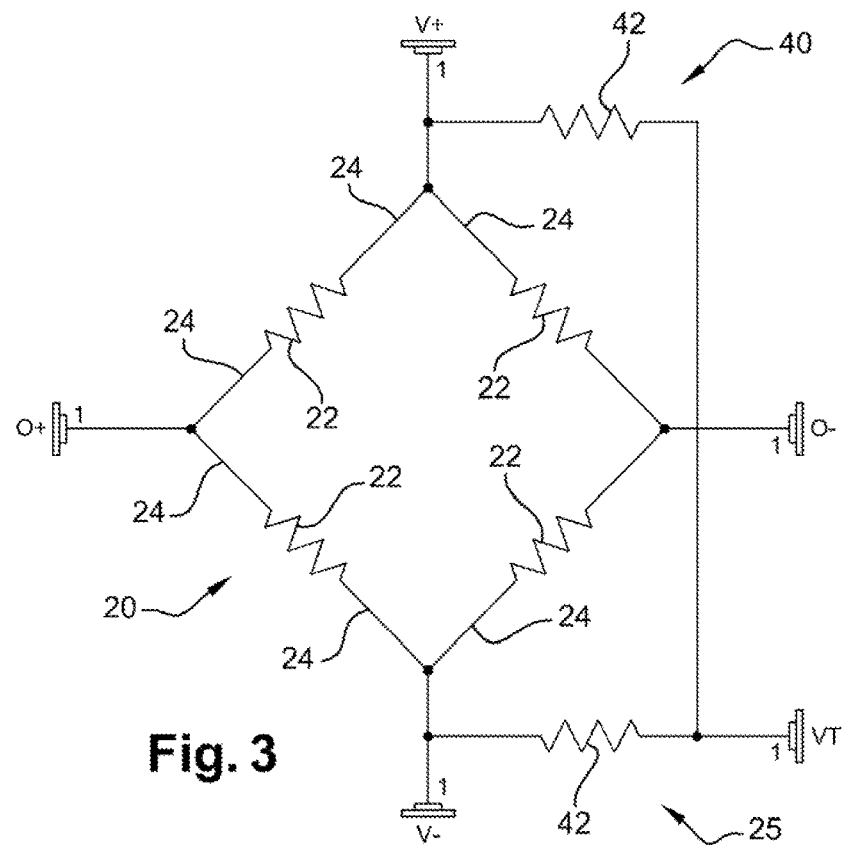
FIG. 3 is an electrical diagram of a pressure electronic measuring circuit and a temperature electronic measuring circuit belonging to the pressure and temperature determining device of FIG. 2.

As shown in FIGS. 2 and 3, the piezoresistive tracks 22 form pressure gauges distant from one another. The pressure and temperature determining device 1 further comprises conductive tracks 24 linking these pressure gauges so as to form a pressure measuring electrical circuit 25 (FIG. 3), formed here in a Wheatstone bridge configuration. This Wheatstone bridge operates in a manner that is conventional and known per se.

Similarly, the thermoresistive tracks form temperature gauges distant from one another, and the pressure and temperature determining device 1 comprises conductive tracks linking these temperature gauges so as to form a temperature measuring electrical circuit.

The pressure and temperature determining device 1 further comprises a base 4 which comprises 96% alumina. The base 4 is configured to define a chamber 6 around the piezoresistive tracks 22 and the thermoresistive tracks 42.

Figure 1:
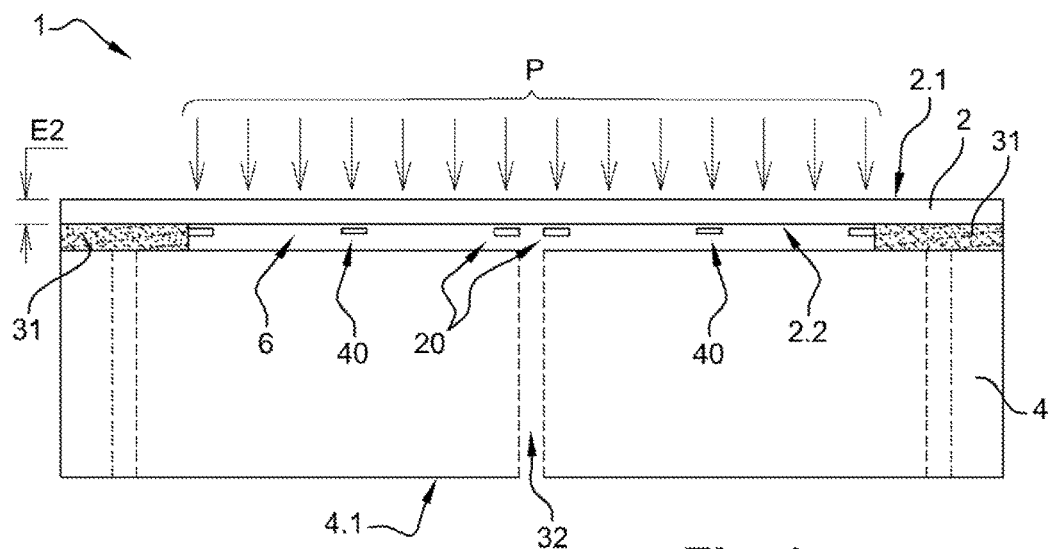
FIG. 1 is a schematic sectional view of a pressure and temperature determining device in accordance with a first embodiment of the invention.

As shown in FIG. 1, the membrane 2 is installed on the base 4. The pressure and temperature determining device 1 comprises, to this end, a glass seal 31 which is secured to the base 4 and to the membrane 2 on the periphery of the securing face 2.2. The glass seal 31 allows hermetically sealing the chamber 6, and therefore, the piezoresistive tracks 22 and the thermoresistive tracks 42. To manufacture the glass seal, glass paste can, for example, be disposed on the periphery of the securing face 2.1, between the membrane 2 and the base 4, then heated up to the melting temperature of the glass.

As shown in FIG. 1, the base 4 has a venting hole 32 which opens out on the one hand onto the membrane 2 and on the other hand onto the outer face 4.1 of the base 4. Such a venting hole 32 allows measuring relative pressures P.

Figure 4:
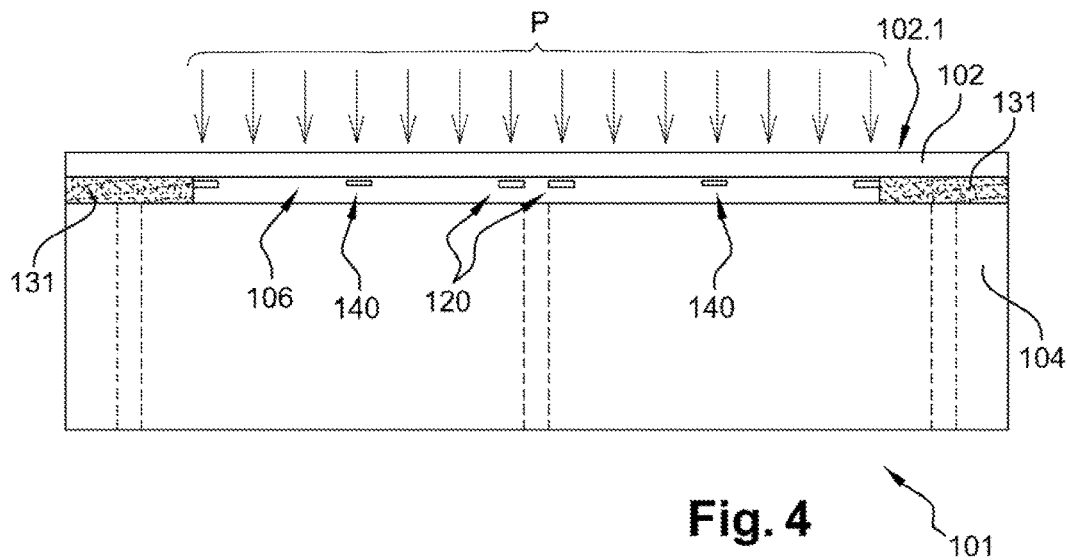
FIG. 4 is a view similar to FIG. 1 and illustrating a pressure and temperature determining device in accordance with a second embodiment of the invention.

FIG. 4 illustrates a pressure and temperature determining device 101 in accordance with a second embodiment of the invention. The pressure and temperature determining device 101 is similar to the pressure and temperature determining device 1 which is described in relation with the FIGS. 1 to 3.

Thus, the pressure and temperature determining device comprises in particular:
- a membrane 102 with a contact face 102.1,
- a base 104, defining a chamber 106,
- a glass seal 131 disposed in a hermetically sealed manner between the membrane 102 and the base 104,
- a pressure determining element 120 comprising piezoresistive tracks, and
- a temperature determining element 140 comprising thermoresistive tracks.

The pressure and temperature determining device 101 differs from the pressure and temperature determining device 1, because the base 104 is configured so that the chamber 106 is hermetically sealed around the piezoresistive and thermoresistive tracks. In other words, the base 104 is devoid of any venting holes 32. In practice, the base 104 can be manufactured the same way as the base 4, that is to say with a venting hole, then the hole is obturated. Thus, the pressure and temperature determining device 101 can determine absolute pressures, whereas the pressure and temperature determining device 1 can determine relative pressures.

FIG. 5 illustrates the temperature and pressure sensor 51, which is intended to measure pressures P and temperatures of the fluid F.

As shown in FIGS. 5 and 6, the pressure and temperature sensor 51 comprises:
- the pressure and temperature determining device 1;
- a coupling member 54 configured to fluidly couple the contact face 2.1 to a pipe 62 of the fluid F,
- a signal conditioning electronic unit 56 (FIG. 6) connected on the one hand to the piezoresistive tracks 22 and on the other hand to the thermoresistive tracks 42, and
- a connector 58 linked to the signal conditioning electronic unit 56 and having output terminals 59.

In the example of FIGS. 5 and 6, the coupling member 54 has a passageway 64 fluidly coupling the contact face 2.1 to the pipe 62. The coupling member 54 is configured here so as to be coupled, perpendicular to the flow direction of the fluid inside a pipe belonging to the automotive vehicle.

When the pressure and temperature sensor 51 is in use, the fluid F is in contact with the contact face 2.1, in such a way that the pressure and temperature determining device 1 can determine the pressure P and the temperature of the fluid F.

The signal conditioning electronic unit 56 is formed here on a printed circuit which is installed on the base 4. The signal conditioning electronic unit 56 may comprise a signal amplifier and/or a component for linearizing signals, which are integrated in an Application-Specific Integrated Circuit (ASIC). The signal conditioning electronic unit here delivers an analog response to the output terminals 59 of the connector 58.

The coupling member 54 and the connector 58 are herein composed of polyamide (PA). The coupling member 54 here is filled with a conductive material such as carbon black, thereby preventing the accumulation of electrostatic charges. The outer surface of the pressure and temperature sensor 51 may include a coating of an electrically conductive material, which forms an electromagnetic shielding.

The pressure and temperature sensor 51 further comprises an O-ring joint 60 which is compressed between the contact face 2.1 and the periphery of the coupling member 54. The passageway 64 of the coupling member 54 here has a substantially circular section, the diameter D64 of which is substantially equal to the internal diameter of the O-ring joint 60 after compression of the O-ring joint 60, thereby avoiding or limiting the occurrence of areas of stagnation of the fluid F. The diameter D64 of the passageway 64 is here about 4 mm. In use, the fluid F flows from the pipe 62 through the passageway 64 up to the contact face 2.1.

In order to make FIGS. 5 and 6 more readable, the O-ring joint 60 is represented in its state before compression. However, FIGS. 5 and 6 represent the pressure and temperature sensor 51 in an assembled configuration, in which the O-ring joint 60 is normally compressed.

As shown in FIG. 6, the pressure and temperature sensor 51 further comprises bearing pads 70 which are arranged in a bearing plane on the one hand against the base 4 and on the other hand against the connector 58.

As shown in FIGS. 5 and 6, the coupling member 54 includes a fastening portion 54.5 and the connector 58 includes a fastening part 58.5. The fastening portion 54.5 is secured to the fastening part 58.5 by welds which are not referenced. The fastening portion 54.5 and the fastening part 58.5 have complementary shapes, thereby allowing their engagement. In this case, the fastening portion 54.5 of the coupling member 54 entirely covers the fastening part 58.5 of the connector 58. The dimensions of the fastening portion 54.5 and of the fastening part 58.5 are determined in such a way that the assembly of the fastening portion 54.5 and the fastening part 58.5 is aligned or tight, thereby allowing obtaining a mechanically resistant weld.

The welds between the fastening portion 54.5 and the fastening part 58.5 are located on a welding surface 57 which is perpendicular to the contact face 2.1. In the example of FIGS. 5 and 6, the surface 57 is cylindrical and coaxial with the axis Z64 of the passageway 64 of the coupling member 54.

Moreover, as shown in FIG. 5, the pipe 62 is of the "fir tree coupling" type, because it has annular ribs 63 intended for the attachment of a flexible hose, which is not represented, through which the fluid flows.

To weld the coupling member 54 and the connector 58, the coupling member 54 is composed of a laser-transparent plastic material and the connector 58 is composed of a laser-opaque plastic material. Thus, a laser beam can heat up the fastening part 58.5, at the welding surface 57, without heating up the fastening portion 54.5, throughout its thickness.

Figure 7:
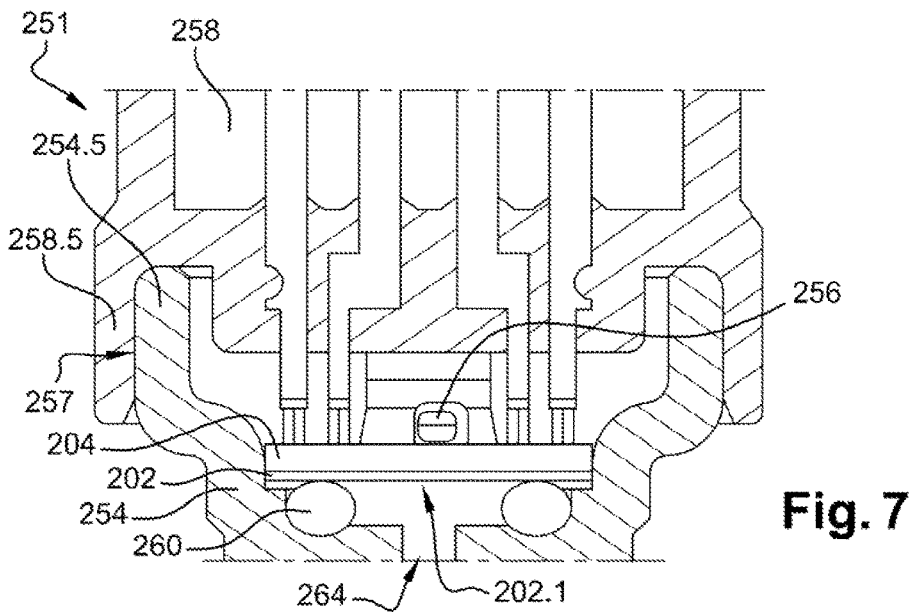
FIG. 7 is a section of a portion of a pressure and temperature sensor in accordance with a third embodiment of the invention and comprising a pressure and temperature determining device in accordance with this third embodiment of the invention.

FIG. 7 illustrates a pressure and temperature sensor 251 in accordance with a third embodiment of the invention. Insofar as the pressure and temperature sensor 251 is similar to the pressure and temperature sensor 51, the description of the pressure and temperature sensor 51 given hereinbefore in relation with FIGS. 1 to 6 can be transposed to the pressure and temperature sensor 251, with the exception of the notable differences stated hereinafter.

A component of the pressure and temperature sensor 251 that is identical or corresponding, by its structure or by its function, to a component of the pressure and temperature sensor 51 has the same reference numeral increased by 200. A membrane 202 is thus defined along with a contact face 202.1, a base 204, a coupling member 254 with a fastening portion 254.5, a signal conditioning electronic unit 256, a connector 258 with a fastening part 258.5 and an O-ring joint 260.

As with the pressure and temperature sensor 51, the fastening portion 254.5 is secured to the fastening part 258.5 by welds, which are not referenced, and complementary shapes allowing engagement of the fastening portion 254.5 and the fastening part 258.5.

The pressure and temperature sensor 251 differs from the pressure and temperature sensor 51, because the fastening part 258.5 of the connector 258 entirely covers the fastening portion 254.5 of the coupling member 254, whereas in the pressure and temperature sensor 51, it is the fastening portion 54.5 that covers the fastening part 58.5.

As with the pressure and temperature sensor 51, the welds between the fastening portion 254.5 and the fastening part 258.5 are located on a welding surface 257 which is perpendicular to the contact face 202.1. In the examples of FIGS. 5 and 6, the welding surface 257 is cylindrical and coaxial with the axis of the passageway 264 of the coupling member 254.

Figure 8:
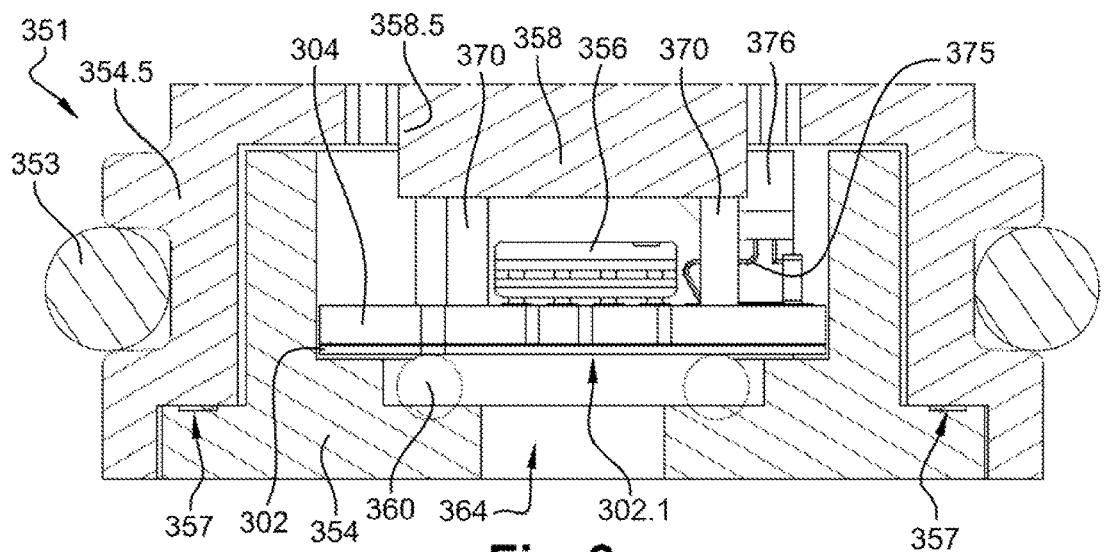
FIG. 8 is a section of a portion of a pressure and temperature sensor in accordance with a fourth embodiment of the invention and comprising a pressure and temperature determining device in accordance with this fourth embodiment of the invention.

FIG. 8 illustrates a pressure and temperature sensor 351 in accordance with a fourth embodiment of the invention. Insofar as the pressure and temperature sensor 351 is similar to the pressure and temperature sensor 51, the description of the pressure and temperature sensor 51 given hereinbefore in relation with FIGS. 1 to 6 can be transposed to the pressure and temperature sensor 351, with the exception of the notable differences stated hereinafter.

A component of the pressure and temperature sensor 351 that is identical or corresponding, by its structure or by its function, to a component of the pressure and temperature sensor 51 has the same reference numeral increased by 300. A membrane 302 is thus defined along with a contact face 302.1, a base 304, a coupling member 354 with a fastening portion 354.5, a signal conditioning electronic unit 356, a connector 358 with a fastening part 358.5 and an O-ring joint 360.

As with the pressure and temperature sensor 51, the fastening portion 354.5 is secured to the fastening part 358.5 by welds, which are not referenced, and complementary shapes allowing engagement of the fastening portion 354.5 and the fastening part 358.5.

The pressure and temperature sensor 351 differs from the pressure and temperature sensor 51, because the welds are located on a welding surface 357 which is parallel to the contact face 302.1. In this case, the welding surface 357 is an annular surface which extends around the passageway 364 of the coupling member 354.

Figure 9:
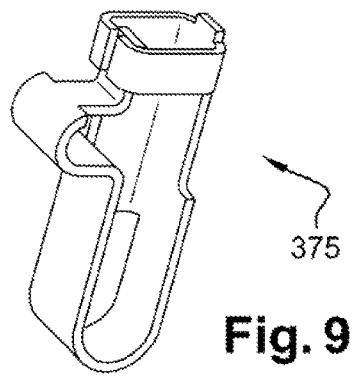
FIG. 9 is a perspective view at a larger scale of a component of the pressure and temperature sensor of FIG. 8.

The pressure and temperature sensor 351 further comprises strips 375 which are elastic and conductive and which are arranged respectively between the output terminals 376 of the connector 358 and the signal conditioning electronic unit 356 or the base 304. FIG. 9 illustrates an example of an elastic and conductive plate such as the strips 375. The strips 375 have a simple assembly of the pressure and temperature sensor 351. It should be noted that the pressure and temperature sensor 51 may also comprise strips similar to the strips 375.

As with the pressure and temperature sensor 51, the pressure and temperature sensor 351 further comprises bearing pads 370 which are arranged in a bearing plane on the one hand against the base 304 and on the other hand against the connector 358.

As shown in FIG. 8, the pressure and temperature sensor 351 further comprises a sealing joint 353 which is adapted to provide hermetical sealing between the pressure and temperature sensor 351 and a complementary housing, which is not represented, of the automotive vehicle. The connector 358 has a groove configured to partially receive the sealing joint 353. In other words, the sealing joint 353 protrudes from the groove, and it may bear against the complementary housing.

Figure 10:
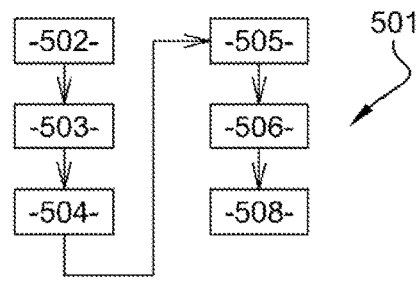
FIG. 10 is a flowchart illustrating a manufacturing method in accordance with the invention.

FIG. 10 illustrates a manufacturing method 501, for manufacturing the pressure and temperature determining device 1. This manufacturing method 501 comprises the steps of:
- 502) depositing conductive tracks 24 on the membrane 2, through a first printing screen, which is not represented, and in thick layer,
- 504) depositing the piezoresistive tracks 22 through a second printing screen, which is not represented, so as to secure the piezoresistive tracks 22 to the membrane 2, and
- 506) depositing the thermoresistive tracks 42, through a third printing screen, which is not represented, so as to secure the thermoresistive tracks 42 to the membrane 2.

The manufacturing method 501 further comprises a step 508) consisting in setting, by laser adjustment (a technique known as "laser trimming"), the piezoresistive tracks 22 and the thermoresistive tracks 42.

After each depositing step 502), 504) and 506), the manufacturing method 501 further comprises steps 503), 505) 507) which respectively consist in carrying out a steaming and a suitable heat treatment in order to evaporate the solvents implemented during the depositing steps 502), 504) and 506).

Subsequently, the pressure and temperature sensor can be assembled as described hereinbefore, in particular with welds carried out with a laser beam. The connector can be manufactured by overmolding. After the assembly of the pressure and temperature sensor, a final step may consist in calibrating and controlling the signals emitted by the piezoresistive and thermoresistive tracks.

In use, as shown in FIG. 5, the fluid F flows in the pipe 62. In use, the fluid F flows from the pipe 62 through the passageway 64 and up to the contact face 2.1.

After the fluid F has come into contact with the contact face 2.1, the membrane 2 transmits the pressure of the fluid to the piezoresistive tracks 22 and the thermoresistive tracks 42 are brought to the temperature of the membrane 2, and therefore to a temperature representative of the temperature of the fluid F. The pressure and temperature determining device 1 thus determines the pressure P and the temperature of the fluid F.

Then, the signal conditioning electronic unit 56 collects and processes the signals emitted by the pressure and temperature determining device 1. This processing may consist in amplifying and/or linearizing these signals by means of an Application-Specific Integrated Circuit (ASIC).

After this processing, the signal conditioning electronic unit 56 generates the response of the pressure and temperature sensor. This response, whether analog or digital, can be read by a central unit of the automotive vehicle, in order to assess the pressure P and the temperature of the fluid F.

Of course, the invention is not limited to the particular examples described in the present application. Other embodiments within the reach of someone skilled in the art may also be considered without departing from the scope of the invention defined by the claims hereinafter.

The invention claimed is:

1. A pressure and temperature determining device, intended to determine pressures and temperatures of a fluid, the pressure and temperature determining device comprising:
   a membrane having a contact face intended to be in contact with the fluid,
   at least one pressure determining element which is sensitive to pressure and which is secured to the membrane, and
   at least one temperature determining element which is sensitive to temperature and which is secured to the membrane;
   wherein:
   said at least one pressure determining element comprises at least one piezoresistive track of a first material, and
   said at least one temperature determining element comprises at least one thermoresistive track of a second material different than the first material.

2. The pressure and temperature determining device according to claim 1, wherein the membrane further has a securing face opposite to the contact face, and wherein said at least one pressure determining element and said at least one temperature determining element are secured directly to the securing face.

3. The pressure and temperature determining device according to claim 1, wherein said at least one piezoresistive track is printed on the membrane, and wherein said at least one thermoresistive track is printed on the membrane.

4. The pressure and temperature determining device according to claim 1, wherein said at least one piezoresistive track forms several pressure gauges distant from one another, the pressure and temperature determining device further comprising conductive tracks linking the pressure gauges so as to form a pressure measuring electrical circuit.

5. The pressure and temperature determining device according to claim 1, wherein the membrane is composed of a ceramic.

6. The pressure and temperature determining device according to claim 1, wherein the membrane is substantially flat.

7. The pressure and temperature determining device according to claim 1, further comprising a base, said base being configured to define a chamber around said at least one piezoresistive track and said at least one thermoresistive track.

8. The pressure and temperature determining device according to claim 7, wherein the base has at least one venting hole opening on the one hand onto the membrane and on the other hand onto an outer face of the base.

9. A pressure and temperature sensor intended to measure pressures and temperatures of a fluid, the pressure and temperature sensor comprising at least:
   a pressure and temperature determining device according to claim 1,
   a coupling member configured to fluidly couple a contact face of the pressure and temperature device to a pipe of the fluid,
   a signal conditioning electronic unit connected on the one hand to said at least one piezoresistive track and on the other hand to said at least one thermoresistive track, and
   a connector linked to the signal conditioning electronic unit and having output terminals.

10. The pressure and temperature sensor according to claim 9, further comprising an O-ring joint which is compressed between the contact face and the periphery of the coupling member, the coupling member having a passageway for the fluid with a substantially circular section, the diameter of which is substantially equal to the internal diameter of the O-ring joint after compression of the O-ring joint.

11. The pressure and temperature sensor according to claim 9, further comprising at least two bearing pads arranged in a bearing plane on the one hand against the base and on the other hand against the connector.

12. The pressure and temperature sensor according to claim 9, further comprising elastic and conductive strips arranged respectively between said output terminals and the base or said signal conditioning electronic unit.

13. The pressure and temperature sensor according to claim 9, wherein the coupling member includes a fastening portion, wherein the connector includes a fastening part; the fastening portion being secured to the fastening part by welds.

14. The pressure and temperature sensor according to claim 13, wherein all or part of the welds are located on at least one welding surface transverse to the contact face.

15. A manufacturing method, for manufacturing a pressure and temperature determining device according to claim 1, the manufacturing method comprising the steps of:
   depositing on the membrane conductive tracks, depositing said at least one piezoresistive track, so as to secure said at least one piezoresistive track to the membrane, and depositing said at least one thermoresistive track, so as to secure said at least one thermoresistive track to the membrane.

16. The manufacturing method according to claim 15, further comprising a step consisting in setting, by laser adjustment (a technique known as "laser trimming"), said at least one piezoresistive track and said at least one thermoresistive track.

* * * * *